US010567387B1

(12) United States Patent
Trinh et al.

(10) Patent No.: US 10,567,387 B1
(45) Date of Patent: Feb. 18, 2020

(54) SYSTEMS AND METHODS FOR MANAGING COMPUTING DEVICE ACCESS TO LOCAL AREA COMPUTER NETWORKS

(71) Applicant: Symantec Corporation, Mountain View, CA (US)

(72) Inventors: Charles Trinh, Anaheim, CA (US); Jin Lu, San Jose, CA (US); Hilario Acevedo, Whittier, CA (US); Marco Alvarado, Lomita, CA (US)

(73) Assignee: Symantec Corporation, Mountain View, CA (US)

( * ) Notice: Subject to any disclaimer, the term of this patent is extended or adjusted under 35 U.S.C. 154(b) by 256 days.

(21) Appl. No.: 15/263,397

(22) Filed: Sep. 13, 2016

(51) Int. Cl.
*H04W 12/06* (2009.01)
*H04L 29/06* (2006.01)
*H04W 12/08* (2009.01)
*H04W 12/04* (2009.01)

(52) U.S. Cl.
CPC ............ *H04L 63/101* (2013.01); *H04L 63/08* (2013.01); *H04W 12/04* (2013.01); *H04W 12/08* (2013.01)

(58) Field of Classification Search
CPC ....... H04L 63/101; H04L 63/08; H04L 63/10; H04L 63/20; H04W 12/04; H04W 12/08
See application file for complete search history.

(56) References Cited

U.S. PATENT DOCUMENTS

| 9,716,691 B2* | 7/2017 | Tapling | H04L 63/04 |
| 2005/0213591 A1* | 9/2005 | Nakazawa | H04L 12/64 370/401 |
| 2008/0077791 A1* | 3/2008 | Lund | H04L 9/3273 713/156 |
| 2010/0235901 A1* | 9/2010 | Simpkins | H04L 63/0281 726/12 |
| 2012/0233674 A1* | 9/2012 | Gladstone | H04L 9/085 726/6 |

(Continued)

OTHER PUBLICATIONS

See if someone is stealing your Wi-Fi network, https://web.archive.org/web/20150217132255/http://visihow.com/See_if_someone_is_stealing_your_Wi-Fi_network—(published Feb. 17, 2015); as accessed on Sep. 2, 2016.

(Continued)

*Primary Examiner* — Kambiz Zand
*Assistant Examiner* — Tongoc Tran
(74) *Attorney, Agent, or Firm* — FisherBroyles, LLP

(57) ABSTRACT

The disclosed computer-implemented method for managing computing device access to local area computer networks may include (i) receiving, at a router computing device, a request to connect a client computing device to a local area computer network, (ii) determining whether the client computing device has prior authorization to connect to the local area computer network, (iii) sending, when the client computing device is determined to not have prior authorization, a request to an administrator computing device for authorization to connect the client computing device to the local area computer network, (iv) receiving, from the administrator computing device, an instruction to allow the client computing device to connect or to block the client computing device from connecting, and (v) performing a security action to block or allow the client computing device's request based on the instruction. Various other methods, systems, and computer-readable media are also disclosed.

20 Claims, 7 Drawing Sheets

(56) References Cited

U.S. PATENT DOCUMENTS

| | | | |
|---|---|---|---|
| 2013/0219476 A1* | 8/2013 | Lin | H04L 9/321 |
| | | | 726/4 |
| 2016/0087942 A1* | 3/2016 | Yaguchi | H04L 63/08 |
| | | | 726/4 |
| 2017/0019409 A1* | 1/2017 | Shalunov | H04L 12/6418 |
| 2017/0164200 A1* | 6/2017 | Naslund | H04L 61/203 |
| 2017/0208071 A1* | 7/2017 | Chui | H04L 63/102 |
| 2017/0257345 A1* | 9/2017 | Westra | H04L 63/029 |

OTHER PUBLICATIONS

How do I track down a potential rogue device on my WiFi network?, http://www.makeuseof.com/answers/track-potential-rogue-device-wifi-network/—(published Oct. 14, 2014); as accessed Sep. 2, 2016.

4 Ways to Manage Your Kid's Internet Use With Your Router, http://www.makeuseof.com/tag/4-ways-to-manage-your-kids-internet-use-with-your-router/—(published Jan. 22, 2014); as accessed on Sep. 2, 2016.

* cited by examiner

SYSTEMS AND METHODS FOR MANAGING COMPUTING DEVICE ACCESS TO LOCAL AREA COMPUTER NETWORKS

BACKGROUND

Local area networks ("LAN"), such as home and business networks, are commonly hosted by routers that connect users, via Wi-Fi and/or Ethernet, to the internet and to various other devices connected to the LAN, such as printers, smart televisions, and gaming systems. Routers typically use password protection to manage computing devices connected to the routers and to ensure that unauthorized parties are prevented from joining the networks hosted by the routers or accessing data transmitted by the routers. For example, wired equivalent privacy ("WEP") or Wi-Fi Protected Access ("WPA") may be utilized to encrypt data transmitted over routers and prevent access by unauthorized users.

However, when a number of devices are connected to a LAN hosted by the router, the available data bandwidth for the router may be significantly reduced, slowing down the transmission of data over the router. Content (e.g., streaming videos, music, video games, etc.) transmitted over routers increasingly requires greater amounts of bandwidth in order to meet user expectations. A network administrator may regulate the number of devices connected to a router by limiting the number of users who receive a password to connect to the router. However, over time, a number of users, including both authorized and unauthorized users, may obtain a password to connect to the router.

For example, a guest may gain access to a home or business router during a visit to the home or business and may retain the password information for connecting to the router following the visit. Subsequently, the guest may continue to access the router without ongoing permission from the owner of the router. Typically, the owner of the router must reset the connection password on the router to prevent the guest from continuing to access the router. However, resetting the password may inconvenience the owner and other users, who are forced to obtain the new password and change their login information each time the password is reset. Additionally, the procedures for resetting the connection password may be difficult for many users. The instant disclosure, therefore, identifies and addresses a need for systems and methods for managing computing device access to local area computer networks.

SUMMARY

As will be described in greater detail below, the instant disclosure describes various systems and methods for managing computing device access to local area computer networks.

In one example, a computer-implemented method for managing computing device access to local area computer networks may include (i) receiving, at a router computing device, a request to connect a client computing device to a local area computer network hosted by the router computing device, (ii) determining, by the router computing device, whether the client computing device has prior authorization to connect to the local area computer network, (iii) sending, when the client computing device is determined to not have prior authorization to connect to the local area computer network, a request to an administrator computing device for authorization to connect the client computing device to the local area computer network, (iv) receiving, from the administrator computing device, an instruction to allow the client computing device to connect to the local area computer network or to block the client computing device from connecting to the local area computer network, and (v) performing, at the router computing device, a security action to block or allow the client computing device's request based on the instruction received from the administrator computing device. Various other methods, systems, and computer-readable media are also disclosed.

In some examples, the security action may include either connecting the client computing device to the local area computer network when the response from the administrator computing device indicates that the client computing device is authorized to connect to the local area computer network, or blocking the client computing device from connecting to the local area computer network when the response from the administrator computing device indicates that the client computing device is not authorized to connect to the local area computer network.

In at least one example, the administrator computing device may include a network administration application for authorizing and blocking computing device access to the local area computer network. The network administration application may enable a user of the administrator computing device to manually authorize and block computing device access to the local area computer network. The network administration application may also enable a user of the administrator computing device to trigger sending of a request for additional information concerning the client computing device to at least one of the client computing device and one or more other client computing devices.

In one embodiment, determining whether the client computing device has prior authorization to connect to the local area computer network may include determining whether an identifier associated with the client computing device matches an identifier stored at the router computing device. The router computing device may, for example, include a user access list that includes the identifier stored at the router computing device. The disclosed method may further comprise receiving, from the administrator computing device, an instruction to add or remove at least one identifier from the access list. Sending the request to the administrator computing device may include sending at least one of a name, an address, an image, and an icon associated with the client computing device to the administrator computing device.

In some embodiments, the disclosed method may further comprise assigning the client computing device to one of a plurality of user groups. The assignment of the client computing device to one of the plurality of user groups may be based on another instruction received from the administrator computing device. In one example, sending the request to the administrator computing device for authorization to connect the client computing device to the local area computer network may further include sending the request to a backend server, which then sends the request to the client computing device.

In at least one embodiment, the disclosed method may additionally comprise receiving, from the administrator computing device, an administrative key verifying that the administrator computing device has administrative access to the router computing device. The administrative key may have been generated by a backend device by registering, at the backend server, an identifier associated with the administrator computing device, generating the administrative key at the backend server, associating, at the backend server, the administrative key with the identifier, and sending the administrative key to the administrator computing device.

In some embodiments, the disclosed method may further comprise (i) receiving, at the router computing device, the administrative key sent from the administrator computing device, (ii) sending, from the router computing device, a request to the backend server to verify the administrative key, (iii) receiving, at the router computing device, a verification of the administrative key from the backend server, and (iv) setting, at the router computing device, a flag notification to monitor for the administrative key in conjunction with subsequent connection requests.

In one embodiment, the disclosed method may additionally comprise (i) receiving, at the router computing device, a request to connect another client computing device to the local area computer network hosted by the router computing device, (ii) monitoring, at the router computing device, for receipt of the administrative key from the other client computing device for a predetermined period of time, (iii) determining, at the router computing device, that the other client computing device is not the administrator computing device when the administrative key is not received within the predetermined period of time, (iv) determining, when the other client computing device is determined to not be the administrator computing device, whether an identifier associated with the other client computing device matches an identifier stored at the router computing device, and (v) sending, when the identifier associated with the other client computing device does not match an identifier stored at the router computing device, a request to the administrator computing device for authorization to connect the other client computing device to the local area computer network. The disclosed method may also comprise automatically blocking the client computing device from connecting to the local area computer network when a response to the request is not received from the administrator computing device within a specified period of time.

In one embodiment, a system for managing computing device access to local area computer networks may include several modules stored in memory, including (i) a connection module, stored in memory, that receives, at a router computing device, a request to connect a client computing device to a local area computer network hosted by the router computing device, (ii) an authorization module, stored in memory, that determines, by the router computing device, whether the client computing device has prior authorization to connect to the local area computer network, (iii) a communication module, stored in memory, that sends, when the client computing device is determined to not have prior authorization to connect to the local area computer network, a request to an administrator computing device for authorization to connect the client computing device to the local area computer network, and receives, from the administrator computing device, an instruction to allow the client computing device to connect to the local area computer network or to block the client computing device from connecting to the local area computer network, (iv) a security module, stored in memory, that performs, at the router computing device, a security action to block or allow the client computing device's request based on the instruction received from the administrator computing device, and (v) at least one physical processor that executes the connection module, the authorization module, the communication module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, at the router computing device, a request to connect a client computing device to a local area computer network hosted by the router computing device, (ii) determine, by the router computing device, whether the client computing device has prior authorization to connect to the local area computer network, (iii) send, when the client computing device is determined to not have prior authorization to connect to the local area computer network, a request to an administrator computing device for authorization to connect the client computing device to the local area computer network, (iv) receive, from the administrator computing device, an instruction to allow the client computing device to connect to the local area computer network or to block the client computing device from connecting to the local area computer network, and (v) perform, at the router computing device, a security action to block or allow the client computing device's request based on the instruction received from the administrator computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
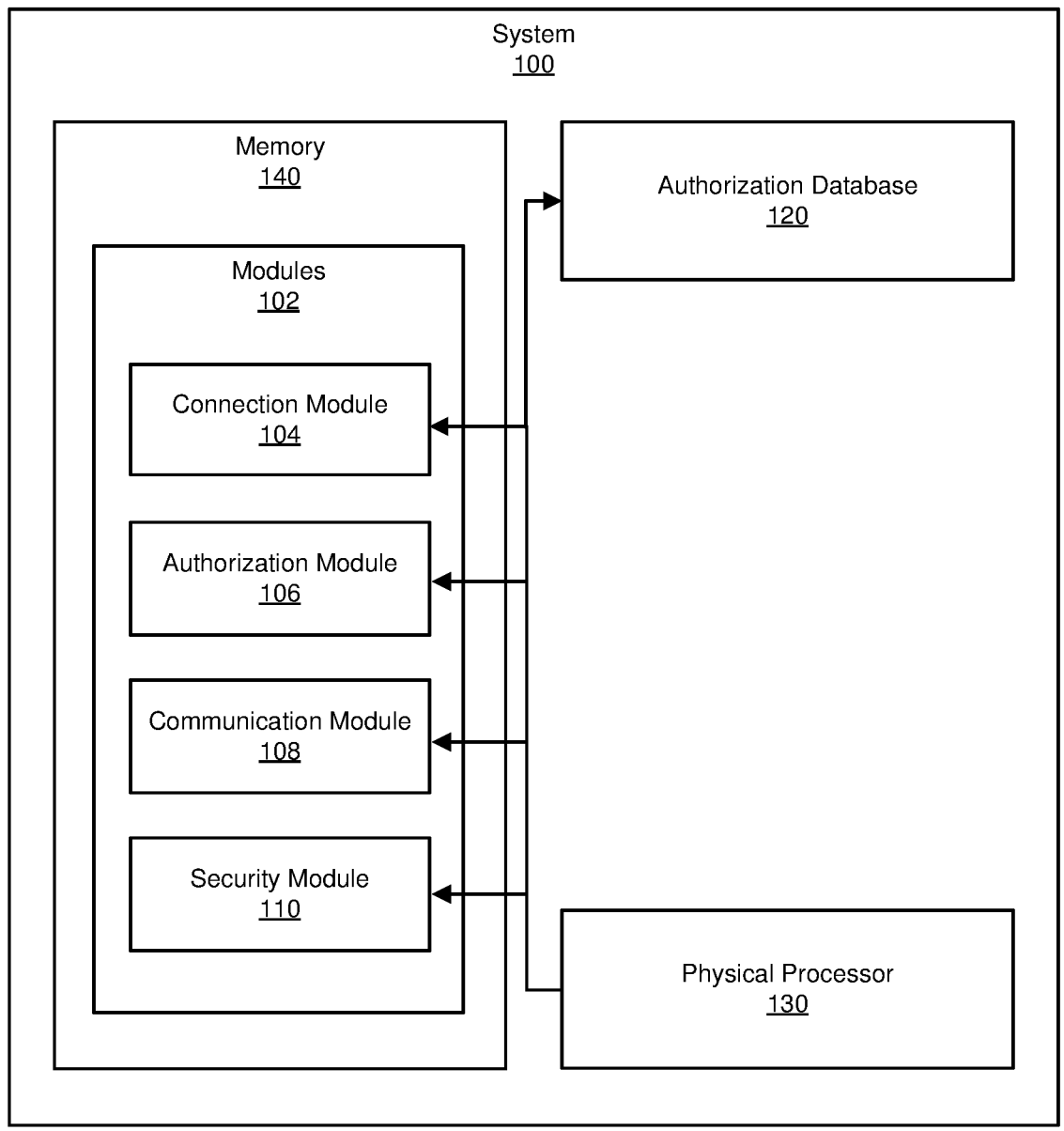
FIG. 1 is a block diagram of an example system for managing computing device access to local area computer networks.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for managing computing device access to local area computer networks. As will be explained in greater detail below, the systems and methods described herein may enable an administrator computing device to manually or automatically allow or block client computing devices from accessing a local area computer network hosted by a router computing device. The disclosed systems and methods may determine whether a client computing device has authorization to access the local area computer network before allowing the client computing device to access local area computer network. If the client computing device does not have authorization, the disclosed systems and methods may notify an administrator computing device of a connection request received from the client computing device and may wait to receive authorization from the administrator computing device before allowing the client computing device to access local area computer network.

Additionally, the disclosed systems and methods may block the client computing device from accessing the local area computer network in response to an instruction from the administrator computing device or when a response is not received from the administrator computing device within a specified period of time. Further, the disclosed systems and methods may enable the administrator computing device to block previously authorized computing devices from continuing to access the router computing device in the future. In some embodiments, a network administration application may be installed on the administrator computing to facilitate management of the router computing device by the administrator computing device.

In certain embodiments, as will be explained in greater detail below, the disclosed systems and methods may direct a backend server to generate an administrative key that is associated with an administrator computing device. The router computing device may monitor for receipt of the administrative key in conjunction with each connection request in order to determine whether the connection request has been received from the administrator computing device. When the administrative key is received and verified by the backend server, the router computing device may grant the administrator computing device administrative access to the router computing device, enabling the administrator computing device to manage the client computing devices permitted to access the router computing device and to modify various settings on the router computing device.

As such, the disclosed systems and methods may improve the functioning of router computing devices by enabling an administrator to better control access to the router computing devices and preventing access by unauthorized computing devices, thereby reducing router bandwidth that is used by such unauthorized computing devices. These systems and methods may also improve the ease with which access to the router computing devices may be managed by enabling an administrator to allow or block access by individual client computing devices without having to reset the router password using the network administration application.

Figure 2:
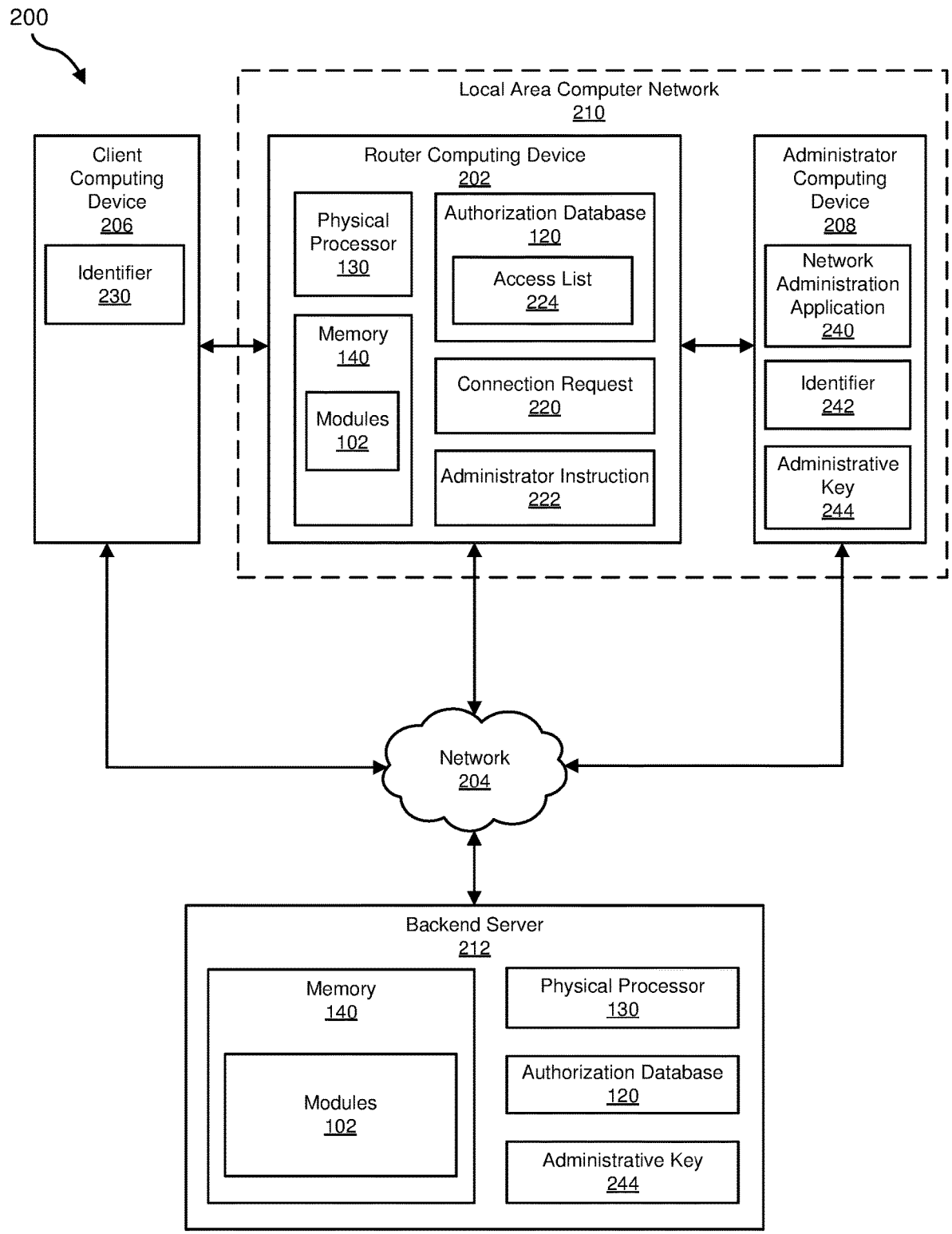
FIG. 2 is a block diagram of an additional example system for managing computing device access to local area computer networks.

The following will provide, with reference to FIGS. 1-2, detailed descriptions of example systems for managing computing device access to local area computer networks. Detailed descriptions of corresponding computer-implemented methods will also be provided in connection with FIG. 3. Detailed descriptions of exemplary decision trees for managing computing device access to local area computer networks will also be provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an example system 100 for managing computing device access to local area computer networks. As illustrated in this figure, example system 100 may include one or more modules 102 for performing one or more tasks. As will be explained in greater detail below, modules 102 may include a connection module 104 that receives, at a router computing device, a request to connect a client computing device to a local area computer network hosted by the router computing device. Example system 100 may additionally include an authorization module 106, that determines, by the router computing device, whether the client computing device has prior authorization to connect to the local area computer network. Example system 100 may further include a communication module 108 that (i) sends, when the client computing device is determined to not have prior authorization to connect to the local area computer network, a request to an administrator computing device for authorization to connect the client computing device to the local area computer network and (ii) receives, from the administrator computing device, an instruction to allow the client computing device to connect to the local area computer network or to block the client computing device from connecting to the local area computer network. Additionally, example system 100 may include a security module 110 that performs, at the router computing device, a security action based on the instruction received from the administrator computing device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., router computing device 202, administrator computing device 208, and/or backend server 212). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more databases, such as authorization database 120. In one example, authorization database 120 may be configured to store information relating to client computing devices having authorization to access a network hosted by a router. Database 120 may represent portions of a single database or computing device or a plurality of databases or computing devices. For example, database 120 may represent a portion of router computing device 202 and/or backend server 212 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as router computing device 202, backend server 212 in FIG. 2, computing system 610 in FIG. 6, and/or portions of exemplary network architecture 700 in FIG. 7.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing computing device access to local area computer networks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a router computing device 202 in communication with a client computing device 206 and/or an administrator computing device 208. In some embodiments, administrator computing device 208 may be connected to router computing device 202 as part of local area computer network 210. Router computing device 202 may also be in communication with a backend server 212 via a network 204. In at least one example, client computing device 206 and/or administrator computing device 208 may be in communication with backend server 212 via network 204. In one example, all or a portion of the functionality of modules 102 may be performed by router computing device 202, administrator computing device 208, backend server 212, and/or any other suitable computing system.

As will be described in greater detail below, one or more of modules 102 from FIG. 1 may, when executed by at least one processor of router computing device 202 and/or backend server 212, enable router computing device 202, administrator computing device 208, and/or backend server 212 to manage computing device access to local area computer network 210. For example, and as will be described in greater detail below, connection module 104 may receive, at router computing device 202, a request to connect client computing device 206 to local area computer network 210, which is hosted by router computing device 202. Authorization module 106 may determine, by router computing device 202, whether client computing device 206 has prior authorization to connect to local area computer network 210.

Communication module 108 may send, when client computing device 206 is determined to not have prior authorization to connect to local area computer network 210, a request to administrator computing device 208 for authorization to connect client computing device 206 to local area computer network 210. Additionally, communication module 108 may receive, from administrator computing device 208, an instruction to allow client computing device 206 to connect to local area computer network 210 or to block client computing device 206 from connecting to local area computer network 210. Security module 110 may perform, at router computing device 202, a security action to block or allow the client computing device's request based on the instruction received from administrator computing device 208.

Router computing device 202 generally represents any type or form of computing device capable of reading computer-executable instructions. In one example, router computing device 202 may be a networking router, such as a cable router, a Digital Subscriber Line (DSL) router, or any other suitable router computing device, that forwards data packets between connected computing devices, such as client computing device 206 and administrator computing device 208, the internet, and/or other connected networks.

Client computing device 206 and administrator computing device 208 each generally represent any type or form of computing device that is capable of connecting to router computing device 202 via, for example, a Wi-Fi connection and/or a wired connection (e.g., Ethernet). Examples of client computing device 206 and administrator computing device 208 include, without limitation, laptops, tablets, desktops, servers, Personal Digital Assistants (PDAs), multimedia players, embedded systems, wearable devices (e.g., smart watches, smart glasses, etc.), gaming consoles, variations or combinations of one or more of the same, computing system 610 in FIG. 6, and/or any other suitable computing device.

Backend server 212 generally represents any type or form of computing device that is capable of generating, storing, associating, and/or distributing client device access and/or security data. Examples of backend server 212 include, without limitation, security servers, application servers, web servers, storage servers, and/or database servers configured to run certain software applications and/or provide various security, web, storage, and/or database services. Although illustrated as a single entity in FIG. 2, backend server 212 may include and/or represent a plurality of servers that work and/or operate in conjunction with one another.

Network 204 generally represents any medium or architecture capable of facilitating communication or data transfer. In one example, network 204 may facilitate communication between router computing device 202, client computing device 206, administrator computing device 208, and/or backend server 212. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Local area computer network 210 generally represents any medium or architecture capable of facilitating communication or data transfer between router computing device 202 and administrator computing device 208 and/or client computing device 206. Examples of local area computer network 204 include, without limitation, a Local Area Network (LAN), a Personal Area Network (PAN), an intranet, portions of one or more of the same, variations or combinations of one or more of the same, and/or any other suitable network.

Figure 3:
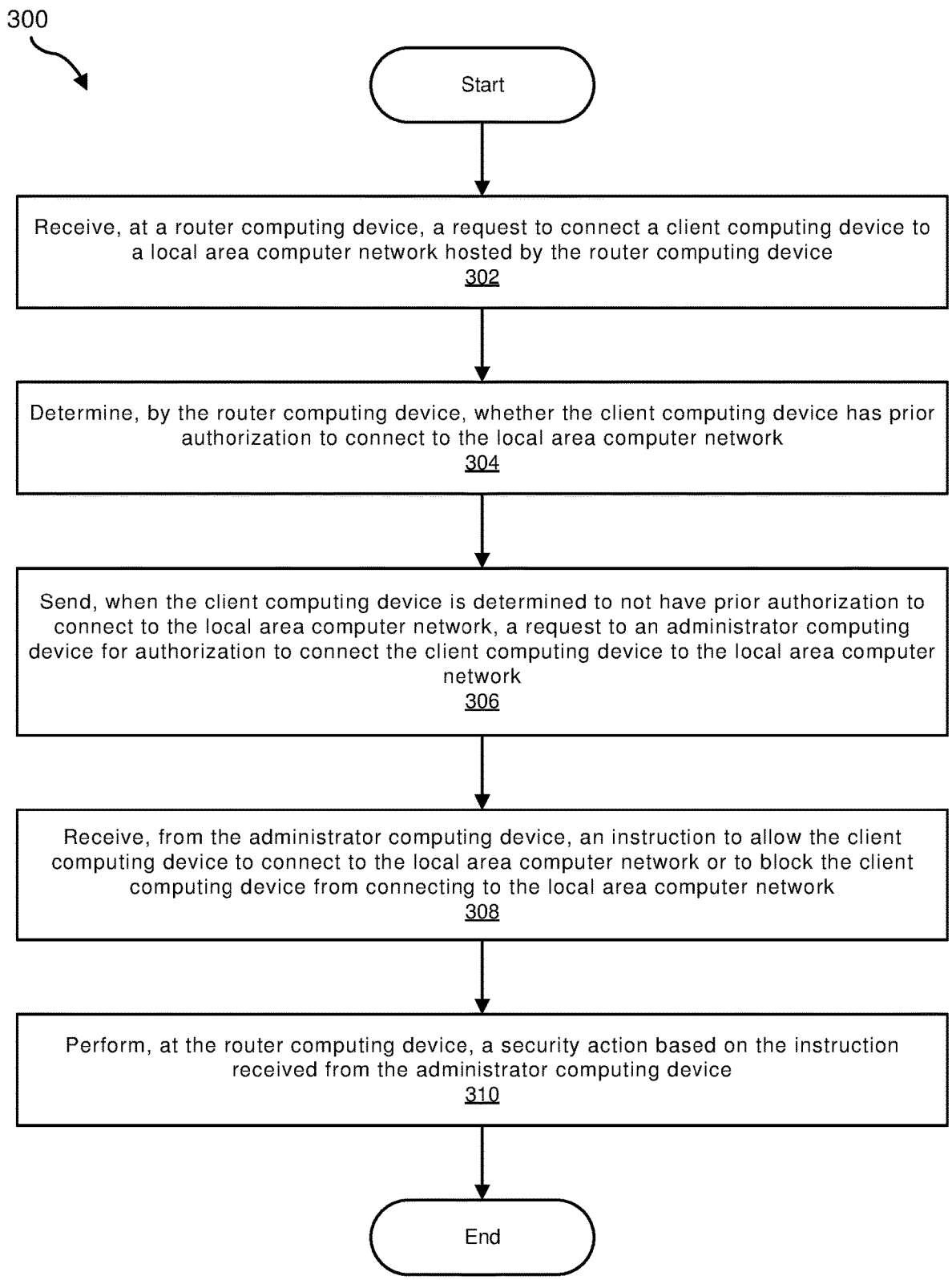
FIG. 3 is a flow diagram of an example method for managing computing device access to local area computer networks.

FIG. 3 is a flow diagram of an example computer-implemented method 300 for managing computing device access to local area computer networks. The steps shown in FIG. 3 may be performed by any suitable computer-executable code and/or computing system, including system 100 in FIG. 1, system 200 in FIG. 2, computing system 610 in FIG. 6, portions of exemplary network architecture 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive, at a router computing device, a request to connect a client computing device to a local area computer network hosted by a router computing device. For example, connection module 104 may, as part of router computing device 202 in FIG. 2, receive a connection request 220 from client computing device 206 to connect client computing device 206 to a local area computer network 210 hosted by router computing device 202.

Communication module 104 may receive connection request 220 in a variety of contexts. For example, router computing device 202 may provide a Wi-Fi signal that reaches a coverage area around router computing device 202. Client computing device 206 may be positioned within the coverage area and may send connection request 220 to router computing device 202. In one example, client computing device 206 may be a user computing device (e.g., a smartphone, laptop, tablet, etc.) that is operated by a user. The user may see an indication on client computing device 206 that local area computer network 210, which is hosted by router computing device 202, is within range. The user may then direct client computing device 206 to attempt to connect to local area computer network 210 and client computing device 206 may send connection request 220 to router computing device 202. In additional examples, client computing device 206 may automatically attempt to connect to local area computer network 210 by sending connection request 220 when client computing device 206 is within Wi-Fi range of router computing device 202. Router computing device 202 may or may not require a password before allowing computing devices, such as client computing device 206, to access, or attempt to access, local area computer network 210. As will be described in greater detail below, the disclosed systems and methods may allow router computing device 202 to manage access to local area computer network 210 regardless of whether a connection password is required.

At step 304 in FIG. 3, one or more of the systems described herein may determine, by the router computing device, whether the client computing device has prior authorization to connect to the local area computer network. For example, authorization module 106 may, as part of router computing device 202 in FIG. 2, determine whether client computing device 206 has prior authorization to connect to local area computer network 210.

Authorization module 106 may determine whether client computing device 206 has prior authorization to connect to local area computer network 210 in a variety of ways. Prior authorization to connect to local area computer network 210 may be established by a computing device and/or a user profile having administrative access to router computing device 202 and/or backend server 212. For example, administrator computing device 208 may have administrative access to router computing device 202, allowing administrator computing device 208 to connect to local area computer network 210 and to change configuration settings, including access privileges, on router computing device 202. Authorization database 120 on router computing device 202 and/or backend server 212 may indicate one or more client computing devices having authorization to connect to local area computer network 210.

In one example, administrator computing device 208 may manage configuration settings on router computing device 202 via a network administration application 240 stored on administrator computing device 208. As used herein, the term "application" generally refers to any computer program that causes a computing system to perform useful tasks. Network administration application 240 may interface with router computing device 202 and/or backend server 212 to manage the authorization and connection of client computing devices that are permitted to access local area computer network 210. In at least one example, network administration application 240 may check for available local area computer networks within range of administrator computing device. For example, when administrator computing device 208 is not connected to a network, network administration application 240 may monitor for local area computer networks that are within range of administrator computing device 208. Network administration application 240 may, for example, identify a nearby network (e.g., a Wi-Fi network) and determine a Service Set Identifier (SSID) associated with an Access Point (AP) of the network.

In some examples, network administration application 240 may enable a user of administrator computing device 208 to manually modify access privileges for various client computing devices identified in authorization database 120 to connect to local area computer network 210. In at least one example, network administration application 240 may be set up with certain rules for automatically modifying access privileges for various client computing devices. For example, if a particular client computing device with authorization to access local area computer network 210 has not accessed local area computer network 210 for more than a predetermined period of time, network administration application 240 may direct that the client computing device's authorization to connect to local area computer network 210 be removed from authorization database 120. In some embodiments, an authorized user may interface with router computing device 202 and/or backend server 212 via a HyperText Markup Language (HTML) page in order to manage settings, such as client computing device access privileges, on router computing device 202.

Administrator computing device 208 may connect to and/or interface with router computing device 202 in a variety of ways. For example, administrator computing device 208 may connect directly to router computing device 202 as part of local area computer network 210, as shown in FIG. 2. In some embodiments, administrator computing device 208 may connect to router computing device 202 via network 204. For example, if administrator computing device 208 is not able to connect directly to local area computer network 210 due to administrator computing device 208 being located out of range of local area computer network 210, administrator computing device 208 may remotely connect to router computing device 202 via network 204 (e.g., via an internet connection). Once administrator computing device 208 is connected to router computing device 202, a user of administrator computing device 208 may utilize network administration application 240 to modify settings on router computing device 202, including client computing device access privileges in authorization database 120. In at least one example, administrator computing device 208 may modify settings on router computing device 202 via backend server 212. For example, network administration application 240 of administrator computing device 208 may interface with backend server 212 to modify client computing device access privileges in authorization database 120. Backend server 212 may then make the corresponding changes on router computing device 202.

According to at least one embodiment, authorization module 106 may detect whether a key, such as administrative key 244, is received from client computing device 206 in conjunction with connection request 220. As will be described in greater detail below with respect to FIG. 5, administrative key 244 may be generated and associated with administrator computing device 208 by backend server 212. In some embodiments, backend server 212 may periodically change administrative key 244 and may send the updated administrative key 244 to administrator computing device 208. If administrative key 244 is not received by router computing device 202 within a specified period of time, authorization module 106 may determine whether an identifier 230 associated with client computing device 206 matches an identifier stored at router computing device 202 in authorization database 120. For example, when client computing device 206 sends a connection request 220 to router computing device 202, client computing device 206 may also send an identifier 230, such as an Internet Protocol (IP) address, a Media Access Control (MAC) address, and/or any other unique identifier that is uniquely associated with client computing device 206.

Authorization database 120 may comprise an access list 224 of identifiers associated with one or more client computing devices that are authorized to access local area computer network 210. Access list 224 may comprise a list of identifiers associated with client computing devices that have previously been designated as authorized to access local area computer network 210. In one example, a user of administrator computing device 208 may utilize network administration application 240 to add or remove identifiers stored in access list 224, thereby authorizing or blocking access to local area computer network 210 by client computing devices respectively associated with the identifiers. If identifier 230 associated with client computing device 206 is included in access list 224, authorization module 106 may determine that client computing device 206 is authorized to connect to local area computer network 210 and may allow client computing device 206 to access local area computer network 210. On the other hand, if identifier 230 is not included in access list 224, authorization module 106 may determine that client computing device 206 has not been previously authorized to connect to local area computer network 210 and may not grant access to client computing device 206 without receiving further administrative authorization.

At step 306 in FIG. 3, one or more of the systems described herein may send, when the client computing device is determined to not have prior authorization to connect to the local area computer network, a request to an administrator computing device for authorization to connect the client computing device to the local area computer network. For example, when client computing device 206 is determined by authorization module 106 to not have prior authorization to connect to local area computer network 210, communication module 108 may, as part of router computing device 202 in FIG. 2, send a request to administrator computing device 208 for authorization to connect client computing device 206 to local area computer network 210.

Communication module 108 may send the request to administrator computing device 208 in a variety of ways. In at least one embodiment, communication module 108 may send a request that includes an identifier (e.g., IP address, MAC address, etc.) associated with client computing device 206. In some embodiments, a user of administrator computing device 208 may be notified by network administration application 240 (e.g., via push notification, etc.) of the request to connect client computing device 206 to router computing device 202. For example, network administration application 240 may alert the user by displaying a notification message on a display screen of administrator computing device 208 indicating that a request for authorization to connect client computing device 206 to router computing device 202 has been received. The notification message may include the identifier associated with client computing device 206.

In some embodiments, additional data associated with client computing device 206 may be sent by router computing device 202 to administrator computing device 208. For example, router computing device 202 may send additional data (e.g., a name, an address, an image, an icon, etc.) associated with client computing device 206 to administrator computing device 208. Such additional data may comprise user profile data associated with client computing device 206 and/or a user of client computing device 206. The additional data may be included in a notification message presented by network administration application 240 to a user of administrator computing device 208. The additional data may be received from client computing device 206, backend server 212, and/or one or more other computing devices. In at least one example, additional data associated with client computing device 206 may be requested by administrator computing device 208 in response to a request for authorization to connect client computing device 206 to local area computer network 210. For example, in response to a request to connect client computing device 206 to local area computer network 210, a user of administrator computing device 208 may utilize network administration application 240 to send a request for additional information concerning client computing device 206 to client computing device 206, backend server 212, and/or one or more other client computing devices. In at least one embodiment, network administration application 240 may additionally send a notification to one or more individuals or groups (e.g., family members, friends, work associates, etc.) in order to determine whether any of the individuals are trying to connect to local area computer network 210 and/or to determine whether they know of anyone else attempting to connect to local area computer network 210. A reply by at least one of the individuals may indicate to a user of administrator computing device 208 that client computing device 206 belongs to a known individual and should be authorized to connect to router computing device 202.

At step 308 in FIG. 3, one or more of the systems described herein may receive, from the administrator computing device, an instruction to allow the client computing device to connect to the local area computer network or to block the client computing device from connecting to the local area computer network. For example, communication module 108 may, as part of router computing device 202 in FIG. 2, receive, from administrator computing device 208, an administrator instruction 222 to allow client computing device 206 to connect to local area computer network 210 or to block client computing device 206 from connecting to local area computer network 210.

In at least one embodiment, a user of administrator computing device 208 may utilize network administration application 240 to manually choose whether to allow or block access by client computing device 206 to local area computer network 210. For example, the user of administrator computing device 208 may recognize an identifier and/or other data (e.g., a name, an address, an image, an icon, etc.) associated with client computing device 206 and may, via network administration application 240, send administrator instruction 222 directing router computing device 202 to grant access by client computing device 206 to local area computer network 210. In some embodiments, the user of administrator computing device 208 may receive an indication directly from a user of client computing device 206 that they are attempting to connect client computing device 206 to local area computer network 210, and the user of administrator computing device 208 may accordingly grant access authorization to client computing device 206. For example, the user of client computing device 206 may be a guest that is visiting a residence where router computing device 202 is located, and the guest may directly communicate with the user of administrator computing device 208 that they wish to access local area computer network 210. In certain examples, as discussed above, the user of administrator computing device 208 may receive a notification from a trusted individual (e.g., a family member, friend, work associate, etc.) that client computing device 206 is associated with a known user, and the user of administrator computing device 208 may in turn grant client computing device 206 authorization to access local area computer network 210.

In certain embodiments, the user of administrator computing device 208 may, via network administration application 240, send administrator instruction 222 directing router computing device 202 to block client computing device 206 from accessing local area computer network 210. For example, the user of administrator computing device 208 may not recognize an identifier and/or other data associated with client computing device 206 and/or may not receive an indication that client computing device 206 is associated with a known individual. In some examples, the user of administrator computing device 208 may simply not wish to allow client computing device 206 to access local area computer network 210, and may accordingly send administrator instruction 222 directing router computing device 202 to block client computing device 206 from accessing local area computer network 210.

At step 310 in FIG. 3, one or more of the systems described herein may perform, at the router computing device, a security action to block or allow the client computing device's request based on the instruction received from the administrator computing device. For example, security module 110 may, as part of router computing device 202 in FIG. 2, perform a security action to block or allow the request from client computing device 206 to access local area computer network 210 based on administrator instruction 222 received from administrator computing device 208. Security module 110 may either connect client computing device 206 to local area computer network 210 when administrator instruction 222 indicates that client computing device 206 is authorized to connect to local area computer network 210 or block client computing device 206 from connecting to local area computer network 210 when administrator instruction 222 indicates that client computing device 206 is not authorized to connect to local area computer network 210.

In some embodiments, when administrator instruction 222 indicates that client computing device 206 is authorized to connect to local area computer network 210, security module 110 may modify authorization database 120 to allow client computing device 206 to access local area computer network 210. For example, security module 110 may add an identifier (e.g., IP address, MAC address, etc.) associated with client computing device 206 to access list 224 of authorization database 120. Accordingly, client computing device 206 may also be authorized to access local area computer network 210 in the future. In one embodiment, client computing device 206 may only be authorized to connect to local area computer network 210 for a limited period of time.

In at least one embodiment, administrator instruction 222 may further assign client computing device 206 to at least one of a plurality of user groups. For example, client computing device 206 may be assigned to a user group (e.g., family, friends, guests, work associates, etc.) designated by administrator computing 208. The assignment of client computing device 206 to the at least one user group may be based on administrator instruction 222 or another instruction received from administrator computing device 208.

Figure 4:
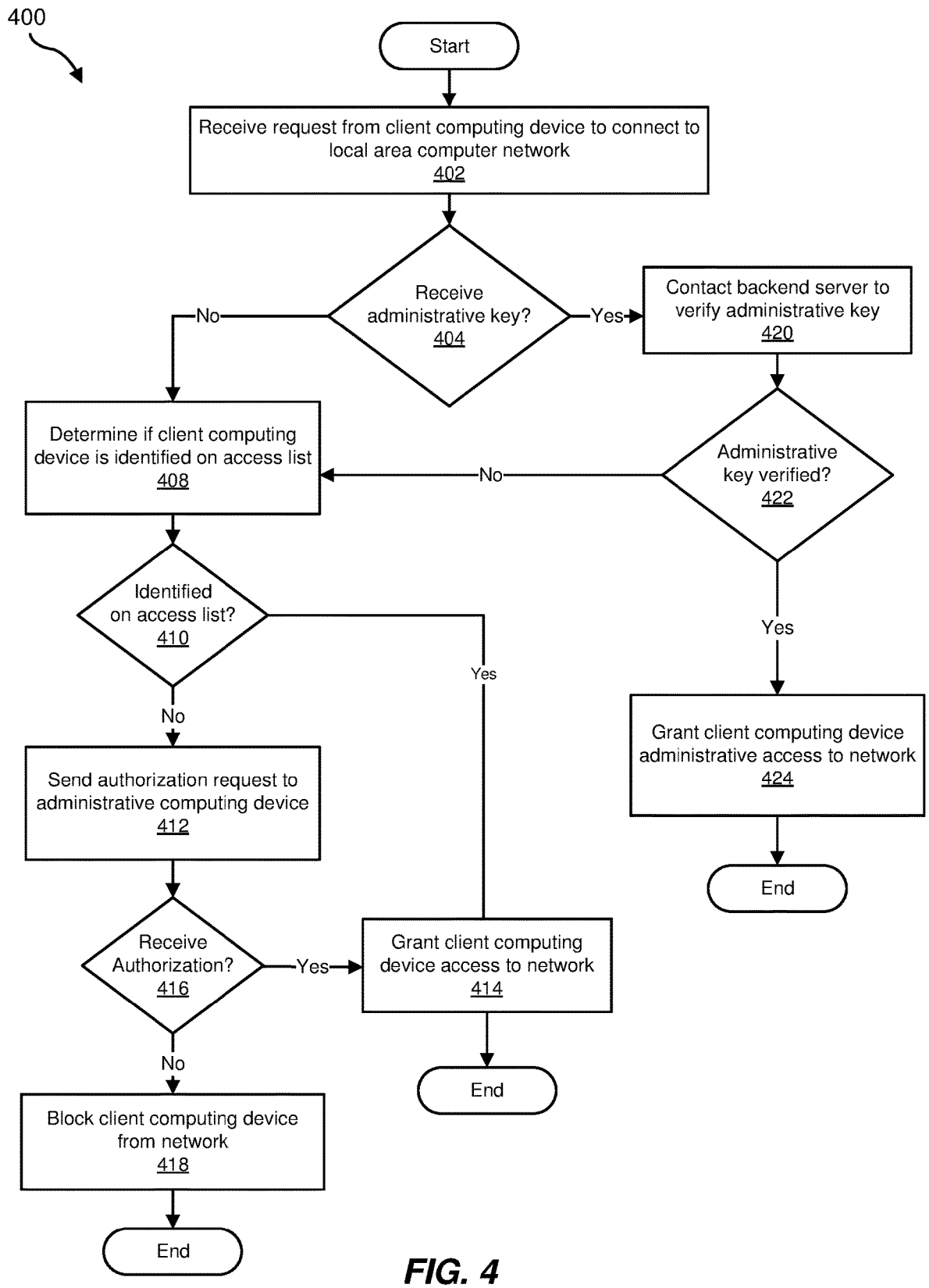
FIG. 4 is a flow diagram of an example decision tree for managing computing device access to local area computer networks.

FIG. 4 illustrates an exemplary decision tree 400 for managing computing device access to local area computer networks in accordance with the disclosed systems and methods. As illustrated in FIG. 4, at step 402, a request may be received from a client computing device to connect to a local area computer network. For example, connection module 104 may, as part of router computing device 202, receive a request from a client computing device (e.g., client computing device 206, administrator computing device 208) to connect to local area computer network 210.

At step 404, authorization module 106 may, as part of router computing device 202, determine whether an administrative key, such as administrative key 244 associated with administrator computing device 208, has been received by router computing device 202 in conjunction with the request to connect to local area computer network 210. If administrative key 244 has not been received by router computing device 202, authorization module 106 may, at step 408, determine if the client computing device (e.g., client computing device 206) is identified on access list 224 of authorization database 120. On the other hand, if administrative key 244 has been received by router computing device 202, authorization module 106 may, at step 420, contact backend server 212 to verify administrative key 244. Backend server 212 may determine whether administrative key 244 exists on backend server 212 and whether administrative key 244 is associated with identifier 242 of the client computing device (e.g., administrator computing device 208).

If administrative key 244 is verified by backend server 212, backend server 212 may send a confirmation to router computing device 202 that administrative key 244 is verified. At step 424, in response to the confirmation received from backend server 212, security module 110 may, as part of router computing device 202, grant the client computing device (e.g., administrator computing device 208) administrative access to local area computer network 210. Alternatively, if administrative key 244 is not verified by backend server 212 at step 422, backend server 212 may send a notification to router computing device 202 that administrative key 244 is not verified. Authorization module 106 may then proceed, at step 408, to determine if the client computing device is identified on access list 224 of authorization database 120.

At step 410, authorization module 106 may, as part of router computing device 202, determine if the client computing device is identified on access list 224 by determining whether an identifier associated with the client computing device (e.g., client computing device 206) is included on access list 224. For example, authorization module 106 may determine whether identifier 230 associated with client computing device 206 matches an identifier on access list 224. If identifier 230 is included on access list 224, then, at step 414, security module 110 may grant client computing device 206 access to local area computer network 210. However, if identifier 230 is not included on access list 224, then, at step 412, communication module 108 may send a request to an administrator computing device (e.g., administrator computing device 208) for authorization to connect client computing device 206 to local area computer network 210.

At step 416, communication module 108 may, as part of router computing device 202, receive authorization from administrator computing device 208 to allow client computing device 206 to connect to local area computer network 210. Alternatively, authorization may not be received from administrator computing device 208; rather, communication module 108 may receive no instruction or instruction 222 may direct router computing device 202 to block client computing device 206 from connecting to local area computer network 210. If administrator instruction 222 authorizes client computing device 206 to access local area computer network 210, then, at step 414, security module 110 may grant client computing device 206 access to local area computer network 210. Alternatively, if administrator instruction 222 does not authorize client computing device 206 to access local area computer network 210, then, at step 418, security module 110 may block client computing device 206 from accessing local area computer network 210.

Figure 5:
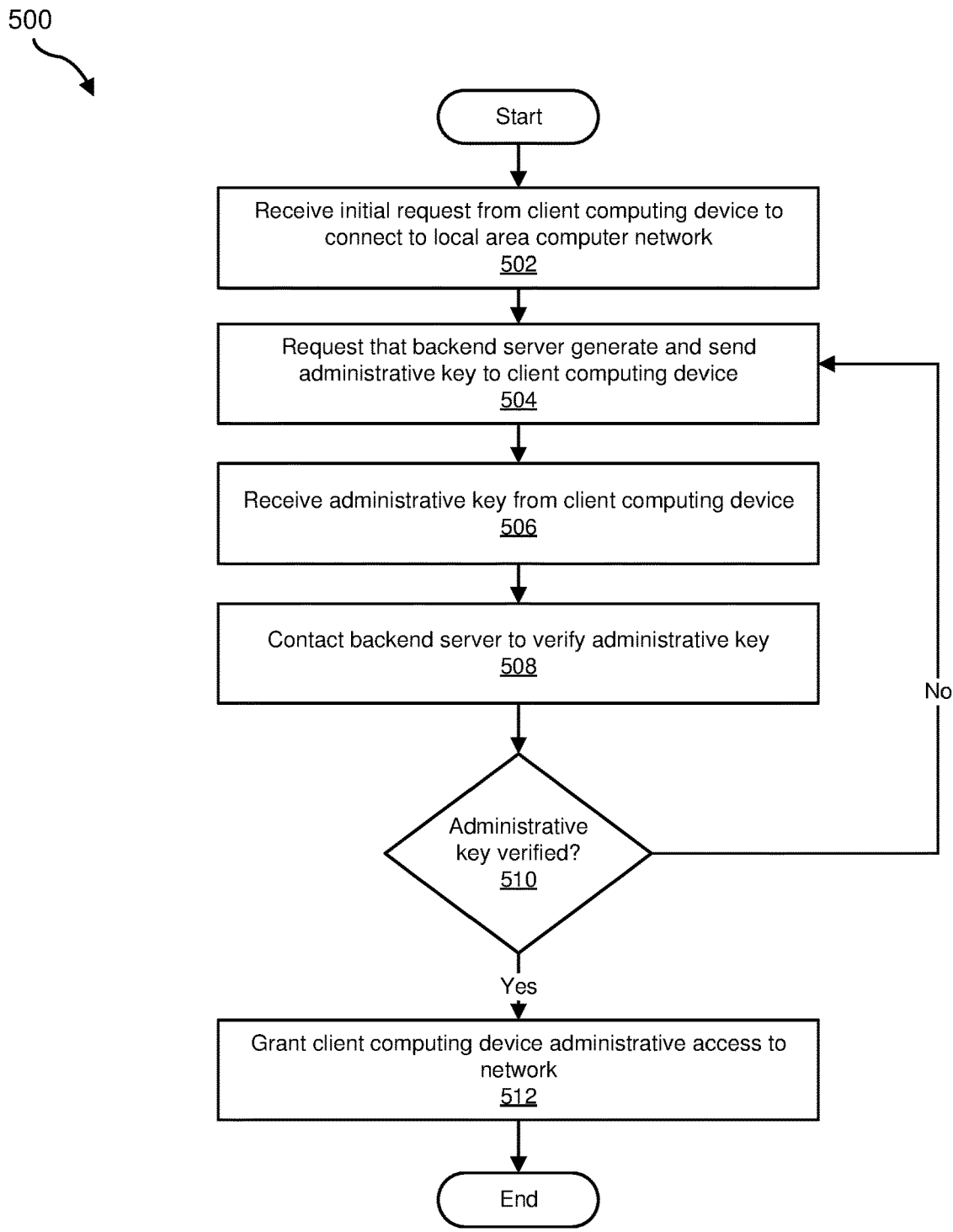
FIG. 5 is a flow diagram of an example decision tree for managing computing device access to local area computer networks.

A client computing device may gain administrative access to a router computing device in a variety of ways. For example, as illustrated in FIG. 5, which illustrates an exemplary decision tree 500 for managing computing device access to local area computer networks, a client computing device may be granted administrative access privileges to a router computing device during an initial setup of the router computing device. At step 502, a router computing device may receive an initial request from a client computing device to connect to the router computing device. For example, connection module 104 may, as part of router computing device 202, receive an initial request from administrator computing device 208 to connect to router computing device 202.

In some embodiments, a user of administrator computing device 208 may install network administration application 240 on administrator computing device 208 prior to initially connecting to and setting up router computing device 202. The user may then use network administration application 240 to send an initial connection request (e.g., connection request 220) to router computing device 202 prior to router computing device 202 receiving any other connection requests. In some embodiments, upon receiving the initial connection request, router computing device 202 may connect with administrator computing device 208 and provide internet access to administrator computing device 208.

At step 504, the router computing device may request that a backend server generate and send an administrative key to the client computing device. For example, communication module 108 may, as part of router computing device 202, request that backend server 212 generate and send an administrative key to administrator computing device 208.

In at least one example, when administrator computing device 208 is connected to router computing device 202, a user of administrator computing device 208 may register an identifier associated with the user and/or with administrator computing device 208. For example, the user may login to a Single Sign-On (SSO) service via, for example, an HTML page accessed over the internet by administrator computing device 208. The SSO service may register a user ID used to login to the SSO service with backend server 212. In some examples, the user of administrator computing device 208 may subsequently utilize the SSO service to login to network administration application 240.

In response to the request by router computing device 202 to generate an administrative key, backend server 212 may newly generate administrative key 244 and associate administrative key 244 with an identifier for administrator computing device 208 (e.g., an IP address, a MAC address, etc.) and/or a user of administrator computing device 208 (e.g., the user ID for the SSO service). Backend server 212 may then send administrative key 244 to administrator computing device 208. In one example, backend server 212 may send administrative key 244 to administrator computing device 208 via network 204. For example, network administration application 240 of administrator computing device 208 may receive administrative key 244 from backend server 212 via a cellular network rather than through a connection provided by router computing device 202.

At step 506, the router computing device may receive the administrative key from the client computing device. For example, communication module 108 may, as part of router computing device 202, receive administrative key 244 from administrator computing device 208. Administrative key 244 may be sent from administrator computing device 208 by network administration application 240. At step 508, the router computing device may contact the backend server to verify the administrative key received from the client computing device. For example, communication module 108 may, as part of router computing device 202, contact backend server 212 to verify administrative key 244.

At step 510, if the administrative key is verified by the backend server, then the router computing device may grant the client computing device administrative access to a local area computer network hosted by the router computing device. For example, if administrative key 244 received by router computing device 202 from administrator computing device 208 is verified by backend server 212, then router computing device 202 may grant administrator computing device 208 administrative access to local area computer network 210. If, however, administrative key 244 is not verified by backend server 212 at step 510, router computing device 202 may again send, step 504, another request to backend server 212 to generate and send an administrative key to administrator computing device 208.

In some embodiments, once administrative key 244 has been verified by backend server 212 and administrator computing device 208 has been granted administrative access during the initial setup of router computing device 202, an internal flag may be set at router computing device 202 indicating that the initial setup is complete. The internal flag will prompt router computing device 202 to check for and verify an administrative key in conjunction with future requests to connect to local area computer network 210. When administrative key 244 is received and verified in conjunction with a connection request, router computing device 202 may grant administrative access privileges to the requesting device.

As described in connection with method 300 and decision trees 400 and 500 above, the systems and methods described herein may enable a user to manually or automatically allow or block client computing devices from accessing a local area computer network (e.g., a home or business Wi-Fi network) hosted by a router computing device (e.g., a cable or DSL router). The disclosed systems and methods may determine whether a client computing device attempting to connect to a local area computer network has prior authorization to access the network before granting access. If the client computing device does not have prior authorization to access the local area computer network, the disclosed systems and methods may enable an administrator to either provide authorization for the client computing device to access the local area computer network or to block the client computing device from accessing the local area computer network. Further, the disclosed systems and methods may enable the administrator computing device to selectively block previously authorized computing devices from accessing the router computing device in the future.

In some embodiments, an application may be installed on an administrator computing device (e.g., cell phone or tablet device) to facilitate management of the router computing device by the administrator computing device. The application may enable the administrator to quickly connect to the router computing device using an administrative key and may facilitate local or remote management of a local network hosted by the router computing device. The administrative key associated with the administrator computing device may be generated and verified by a backend server supporting the router computing device.

As an exemplary embodiment of the disclosed systems and methods, an owner of a router for a home network may quickly allow guests and family members to connect to the home network using a cell phone application on the owner's phone to authorize connections in response to connection requests from the guests and family members while they are visiting. The owner may subsequently wish to block certain individuals that were previously granted access to the home network. For example, the owner may allow a neighbor to access the home network while the neighbor is visiting the owner's home. However, the owner may not want the neighbor to continue to access the home network following the visit. The technology may enable the owner to block the neighbor from continuing to access the home network by using the cell phone application to remove the neighbor's access privileges. Thus, the owner may block previously authorized individuals from connecting to the home network without having to reset the router password.

Accordingly, the disclosed systems and methods may improve the functioning of router computing devices by enabling an administrator to better control access to networks hosted by the router computing devices and preventing access by unauthorized computing devices, thereby reducing router bandwidth that is used by such unauthorized computing devices. The disclosed systems and methods may also improve the ease with which access to the networks may be managed by enabling the administrator to quickly login to the router computing devices using an application installed on the administrator's computing device.

Figure 6:
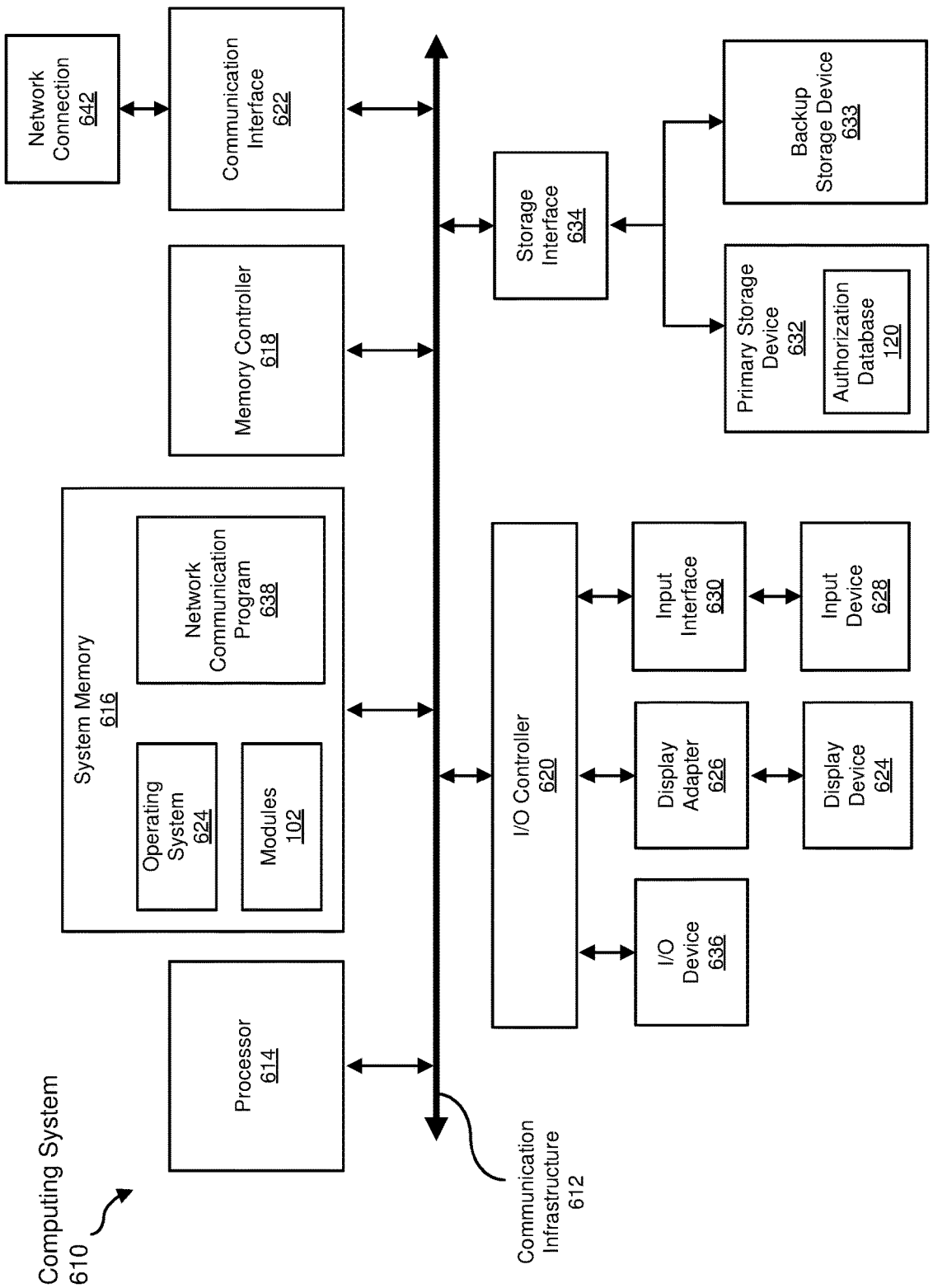
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor 614. In one example, operating system 624 may include and/or represent software that manages computer hardware and software resources and/or provides common services to computer programs and/or applications on computing system 610. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, authorization database 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
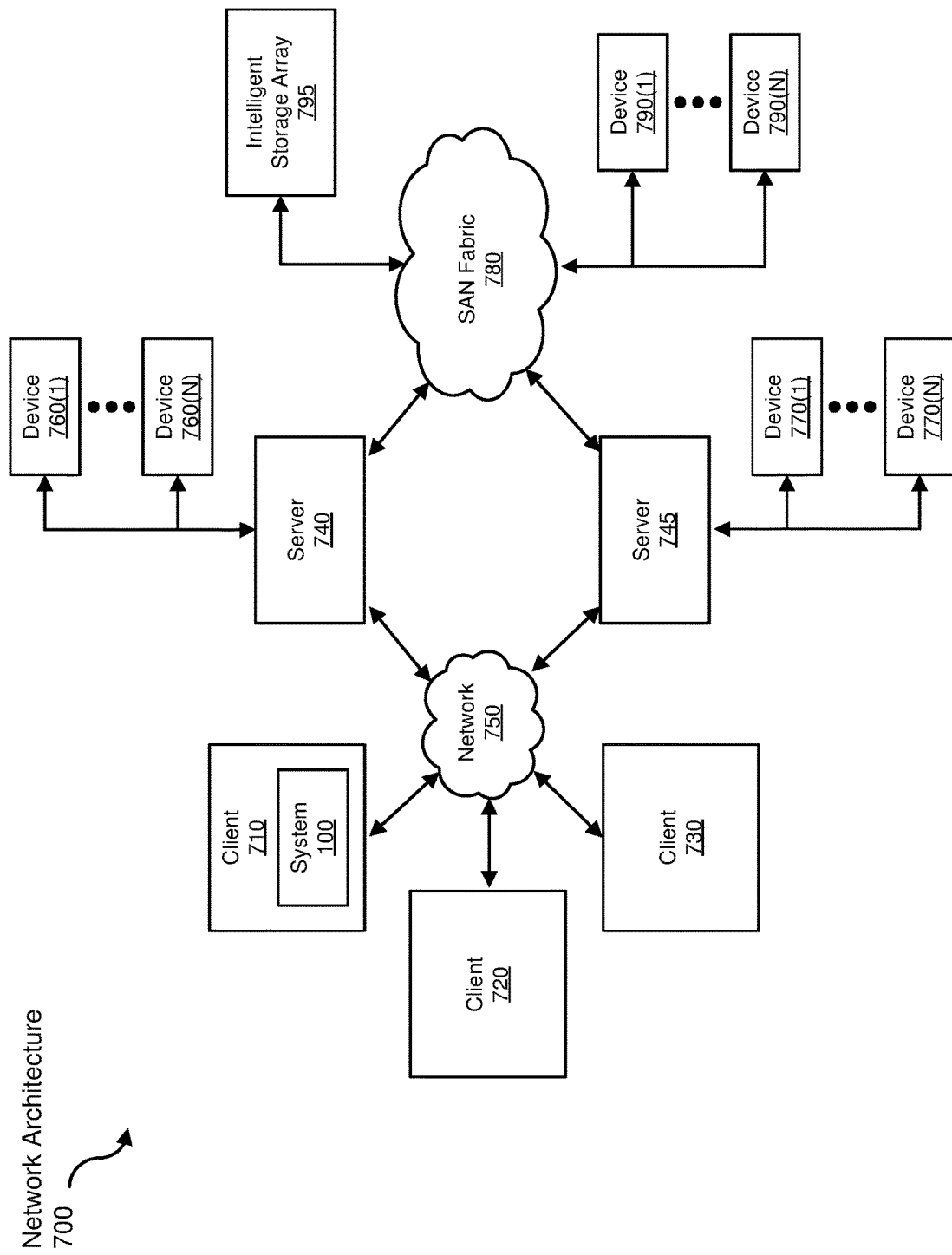
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for managing computing device access to local area computer networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive client computing device access data to be transformed in response to administrator instructions and may transform the client computing device access data by modifying a database to add or remove identifiers for client computing devices authorized to access a local area computer network hosted by a router computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing computing device access to local area computer networks, at least a portion of the method being performed by a router computing device comprising at least one processor, the method comprising:

receiving, at the router computing device, a request to connect a client computing device to a local area computer network hosted by the router computing device;

determining, by the router computing device, whether an administrative key generated by a backend server and associated with an administrator computing device was received in conjunction with the request;

determining, when the administrative key is determined to not have been received, whether the client computing device is identified on an access list of computing devices that have been previously authorized to access the local area computer network;

granting, when the administrative key is determined to have been received or when the client computing device is identified on the access list, the client computing device access to the local area computer network;

sending, when the client computing device is determined to not be identified on the access list, a request to the administrator computing device for authorization to connect the client computing device to the local area computer network, wherein sending the request to the administrator computing device comprises sending the request to the backend server, which then sends the request to the administrator computing device;

sending, from the administrator computing device, a notification to one or more individuals in order to determine whether the client computing device is associated with a known user;

receiving, at the administrator computing device, a notification from the one or more individuals indicating whether the client computing device is associated with a known user and should be authorized to connect to the local area computer network via the router computing device;

in response to the notification indicating whether the client computing device is associated with a known user, receiving, at the backend server and from the administrator computing device, an instruction to allow the client computing device to connect to the local area computer network or to block the client computing device from connecting to the local area computer network;

sending, from the backend server, the instruction received from the administrator computing device to the router computing device; and performing, at the router computing device, a security action to block or allow the client computing device's request based on the instruction received from the administrator computing device.

2. The method of claim 1, wherein the security action comprises:

connecting the client computing device to the local area computer network when the response from the administrator computing device indicates that the client computing device is authorized to connect to the local area computer network; or blocking the client computing device from connecting to the local area computer network when the response from the administrator computing device indicates that the client computing device is not authorized to connect to the local area computer network.

3. The method of claim 1, wherein the administrator computing device comprises a network administration application for authorizing and blocking computing device access to the local area computer network.

4. The method of claim 3, wherein the network administration application enables a user of the administrator computing device to manually authorize and block computing device access to the local area computer network.

5. The method of claim 3, wherein the network administration application enables a user of the administrator computing device to trigger sending of a request for additional information concerning the client computing device to at least one of the client computing device or one or more other client computing devices.

6. The method of claim 1, wherein determining whether the client computing device has prior authorization to connect to the local area computer network comprises determining whether an identifier associated with the client computing device matches an identifier stored at the router computing device.

7. The method of claim 6, wherein the router computing device comprises the access list that includes the identifier stored at the router computing device.

8. The method of claim 7, further comprising receiving, from the administrator computing device, an instruction to add or remove at least one identifier from the access list.

9. The method of claim 1, wherein sending the request to the administrator computing device comprises sending at least one of a name, an address, an image, or an icon associated with the client computing device to the administrator computing device.

10. The method of claim 1, further comprising assigning the client computing device to one of a plurality of user groups.

11. The method of claim 10, wherein the assignment of the client computing device to one of the plurality of user groups is based on another instruction received from the administrator computing device.

12. The method of claim 1, further comprising receiving, from the administrator computing device, an administrative key verifying that the administrator computing device has administrative access to the router computing device.

13. The method of claim 12, wherein the administrative key was generated by the backend server by:
registering, at the backend server, an identifier associated with the administrator computing device;
generating the administrative key at the backend server;
associating, at the backend server, the administrative key with the identifier; and
sending the administrative key to the administrator computing device.

14. The method of claim 13, further comprising:
receiving, at the router computing device, the administrative key sent from the administrator computing device;
sending, from the router computing device, a request to the backend server to verify the administrative key;
receiving, at the router computing device, a verification of the administrative key from the backend server; and
setting, at the router computing device, a flag notification to monitor for the administrative key in conjunction with subsequent connection requests.

15. The method of claim 13, further comprising:
receiving, at the router computing device, a request to connect another client computing device to the local area computer network hosted by the router computing device;
monitoring, at the router computing device, for receipt of the administrative key from the other client computing device for a predetermined period of time;
determining, at the router computing device, that the other client computing device is not the administrator computing device when the administrative key is not received within the predetermined period of time;
determining, when the other client computing device is determined to not be the administrator computing device, whether an identifier associated with the other client computing device matches an identifier stored at the router computing device; and
sending, when the identifier associated with the other client computing device does not match an identifier stored at the router computing device, a request to the administrator computing device for authorization to connect the other client computing device to the local area computer network.

16. The method of claim 15, further comprising automatically blocking the client computing device from connecting to the local area computer network when a response to the request is not received from the administrator computing device within a specified period of time.

17. A system for managing computing device access to local area computer networks, the system comprising:
a connection module, stored in memory, that receives, at a router computing device, a request to connect a client computing device to a local area computer network hosted by the router computing device;
an authorization module, stored in memory, that:
determines, by the router computing device, whether an administrative key generated by a backend server and associated with an administrator computing device was received in conjunction with the request;
determines, when the administrative key is determined to not have been received, whether the client computing device is identified on an access list of computing devices that have been previously authorized to access the local area computer network; and
grants, when the administrative key is determined to have been received or when the client computing device is identified on the access list, the client computing device access to the local area computer network;
a communication module, stored in memory, that:
sends, when the client computing device is determined to not be identified on the access list, a request to a backend server, which sends the request to the administrator computing device for authorization to connect the client computing device to the local area computer network;
sends, from the administrator computing device, a notification to one or more individuals in order to determine whether the client computing device is associated with a known user;
receives, at the administrator computing device, a notification from the one or more individuals indicating whether the client computing device is associated with a known user and should be authorized to connect to the local area computer network via the router computing device;
in response to the notification indicating whether the client computing device is associated with a known user, receives, from the administrator computing device, an instruction to allow the client computing device to connect to the local area computer network or to block the client computing device from connecting to the local area computer network;
a security module, stored in memory, that performs, at the router computing device, a security action to block or allow the client computing device's request based on the instruction received from the administrator computing device; and
at least one physical processor that executes the connection module, the authorization module, the communication module, and the security module.

18. The system of claim 17, wherein the security action comprises:
connecting the client computing device to the local area computer network when the response from the administrator computing device indicates that the client computing device is authorized to connect to the local area computer network; or
blocking the client computing device from connecting to the local area computer network when the response from the administrator computing device indicates that the client computing device is not authorized to connect to the local area computer network.

19. A non-transitory computer-readable medium comprising one or more computer-executable instructions that, when executed by at least one processor of a computing device, cause the computing device to:
receive, at the router computing device, a request to connect a client computing device to a local area computer network hosted by the router computing device;
determine, by the router computing device, whether an administrative key generated by a backend server and associated with an administrator computing device was received in conjunction with the request;
determine, when the administrative key is determined to not have been received, whether the client computing device is identified on an access list of computing devices that have been previously authorized to access the local area computer network;

grant, when the administrative key is determined to have been received or when the client computing device is identified on the access list, the client computing device access to the local area computer network;

send, when the client computing device is determined to not be identified on the access list, a request to a backend server, which then sends the request to an administrator computing device for authorization to connect the client computing device to the local area computer network;

send, from the administrator computing device, a notification to one or more individuals in order to determine whether the client computing device is associated with a known user;

receive, at the administrator computing device, a notification from the one or more individuals indicating whether the client computing device is associated with a known user and should be authorized to connect to the local area computer network via the router computing device;

in response to the notification indicating whether the client computing device is associated with a known user, receive, from the administrator computing device, an instruction to allow the client computing device to connect to the local area computer network or to block the client computing device from connecting to the local area computer network; and perform, at the router computing device, a security action to block or allow the client computing device's request based on the instruction received from the administrator computing device.

20. The method of claim 1, wherein receiving, at the router computing device, the request to connect the client computing device to the local area computer network hosted by the router computing device comprises receiving the request via a wireless connection or a wired connection.

\* \* \* \* \*